United States Patent [19]
Gunther

[11] 3,804,358
[45] Apr. 16, 1974

[54] FASTENER ASSEMBLY

[75] Inventor: Conrad J. Gunther, Uniondale, N.Y.

[73] Assignee: Dzus Fastener Co., Inc., West Islip, N.Y.

[22] Filed: Feb. 4, 1972

[21] Appl. No.: 223,565

[52] U.S. Cl............. 248/205 R, 24/221 A, 85/8.6, 248/239
[51] Int. Cl............................................. F16b 21/02
[58] Field of Search........ 248/239, 205; 85/8.6, 8.9, 85/8.8; 151/49, 50, 51, 52, 41.75, 69; 24/221

[56] References Cited
UNITED STATES PATENTS

| | | | |
|---|---|---|---|
| 2,271,469 | 1/1942 | Wilson | 248/239 |
| 1,930,645 | 10/1933 | Ellis | 248/239 |
| 1,644,298 | 11/1927 | Ledbetter | 85/8.8 UX |
| 2,745,620 | 5/1956 | Murphy | 248/239 |
| 3,535,752 | 3/1968 | Dzus | 24/221 A |
| 3,656,466 | 4/1972 | Dzus | 24/221 A |

Primary Examiner—Roy D. Frazier
Assistant Examiner—Rodney H. Bonck
Attorney, Agent, or Firm—Kane, Dalsimer, Kane, Sullivan and Kurucz

[57] ABSTRACT

A fastener assembly for fastening two members together and for providing a hanger element on a bracket with an opening therein. The assembly includes a stud member adapted for passage through the opening in the bracket. Means are provided on the assembly to restrict the passage of the stud member through the bracket so that a hanger portion extends from one side of the bracket and a locking portion extends from the other side of the bracket. Locked means are on the assembly which are adapted to engage with the locking portion of the stud member and retain the stud member in a fixed position with respect to the bracket. Finally, the locked means and the stud cooperate to facilitate the rapid interengagement and disengagement therebetween as desired so that the fastener assembly can be rapidly and efficiently associated with a bracket at a variety of different locations thereon.

3 Claims, 5 Drawing Figures

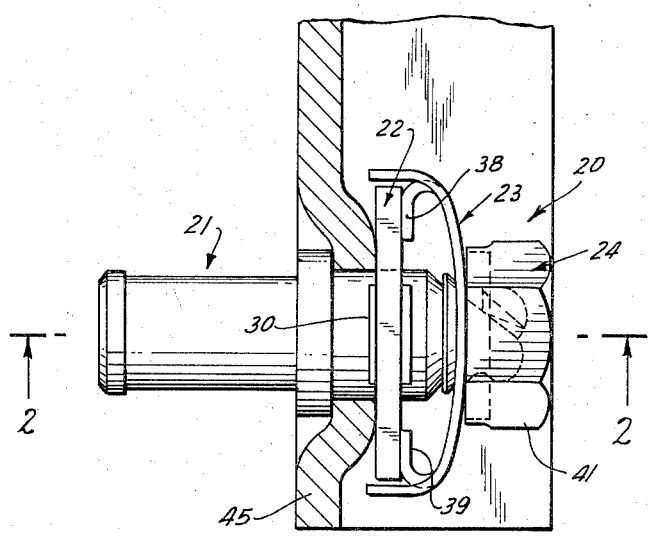
FIG.1
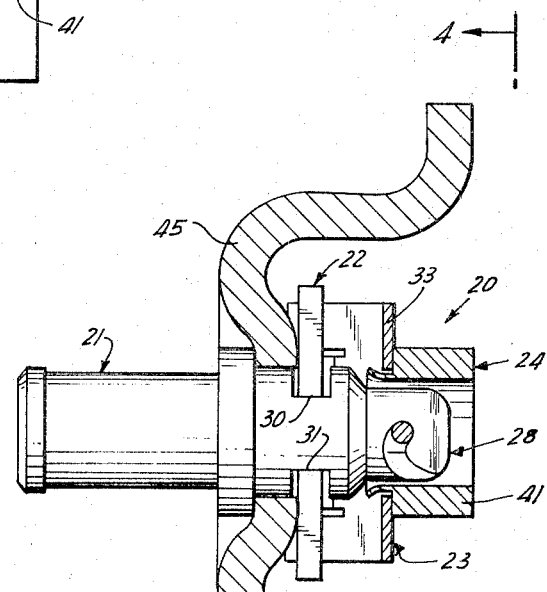
FIG.2
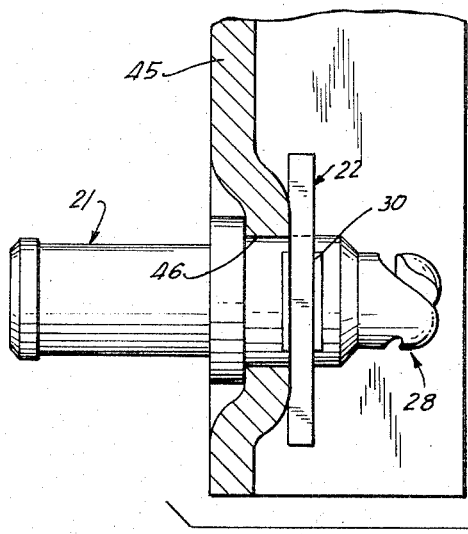
FIG.3
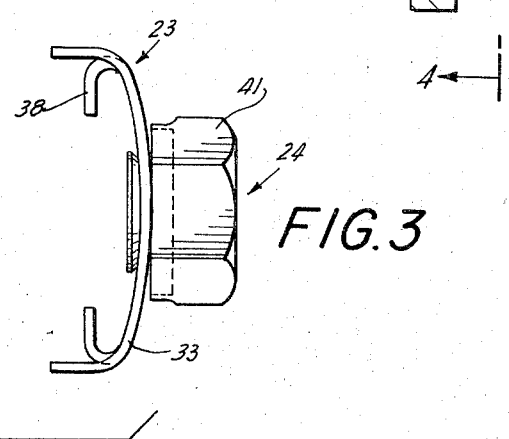

3,804,358

FASTENER ASSEMBLY

BACKGROUND OF THE INVENTION

A high strength quick release fastener which is resistant to loosening due to vibration is highly desirable. Additionally, it is often desirable to provide hanging elements on a wall, a panel, or a bracket. There are many advantages to having the hanger or hangers positioned in a location where it can be easily reached to place objects thereon or to remove objects therefrom while keeping the hangers and any objects positioned thereon out of the way of a normal working area. By being able to position the hangers on a vertical wall or a panel mounted on the wall or a vertical bracket-like structure, the remaining active space within an enclosure can be used for other purposes. In turn, the objects can be easily reached when it is desired to utilize one, for example a tool, and may be easily replaced after use. Additionally, it is often desirable to display objects and being able to hang these objects on vertically positioned hangers to facilitate this objective.

It should be kept in mind that rearrangement of the hanging elements on the wall, panel or bracket, quite frequently is desirable. This naturally depends on the type of objects to be hung as well as the uses to which they are to be put and the manner in which they might be displayed. In accordance with the hanging concept, many times rather heavy objects are to be hung. In those instances, it is advantageous to employ a hanging element which will support great weight while being easily mountable on the supporting structure and which may be easily and quickly rearranged on the supporting structure as required. The quick release feature of the combination fastener and hanger as well as the strength of the fastener is helpful in this regard. Quick release and reassembly is of great value where there is an adjustment in position to be made between two fastened members.

SUMMARY OF THE INVENTION

With the above general concepts in mind, it is among the primary objectives of this invention to provide a fastener assembly which is of a heavy duty type and can be easily assembled and disassembled or repositioned on a supporting structure. The fastener assembly is designed for a fixed rigid interengagement with the bracket, panel or wall to which it is assembled or to fasten two brackets or members together and yet which can be easily and quickly removed from the supporting structure for disassembly purposes or for repositioning at a new location on the supporting structure. The fastener assembly is designed to provide a hanger element extending horizontally from a vertical supporting structure on which light or heavy objects may be hung. The assembly is easily disassembled from one location and reassembled at another location on the vertical supporting structure in a rigid and secure manner to facilitate its supporting heavy loads such as large tools or mechanical parts.

In summary, a fastener assembly is provided for fastening two members and which includes a hanger element for positioning on a bracket. The assembly includes a stud member adapted for passage through the opening in the bracket and means to restrict the passage of the stud member through the bracket so that a hanger portion extends from one side of the bracket and a locking portion extends from the other side of the bracket. Locking means are on the assembly and are adapted to engage with the locking portion of the stud member in retaining of the stud member in a fixed position with respect to the bracket. A locking means in the stud has means thereon to facilitate the rapid interengagement and disengagement therebetween as desired so that the fastener assembly can be rapidly and efficiently associated with the bracket at a variety of different locations thereon.

With the above objectives in mind, reference is had to the attached drawings.

BRIEF DESCRIPTION OF THE DRAWINGS

In the drawings:

FIG. 1 is a side elevation view of the fastener assembly of the invention shown attached to a bracket;

FIG. 2 is a fragmentary sectional view thereof taken along the plane of line 2—2 of FIG. 1;

FIG. 3 is a side elevational view thereof with the nut assembly and spring portion of the fastener assembly disassembled from the remainder of the assembly;

DESCRIPTION OF THE PREFERRED EMBODIMENT

Figure 4:
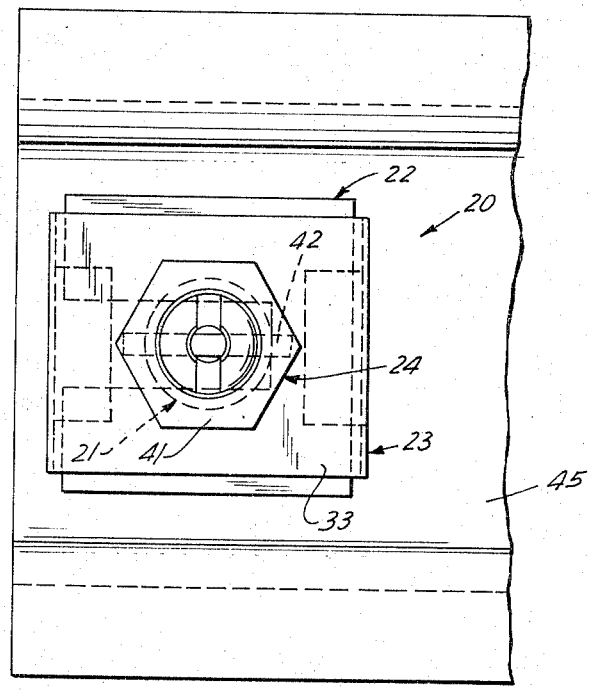
FIG. 4 is a top plan view thereof taken along the plane of line 4—4 of FIG. 2.
Figure 5:
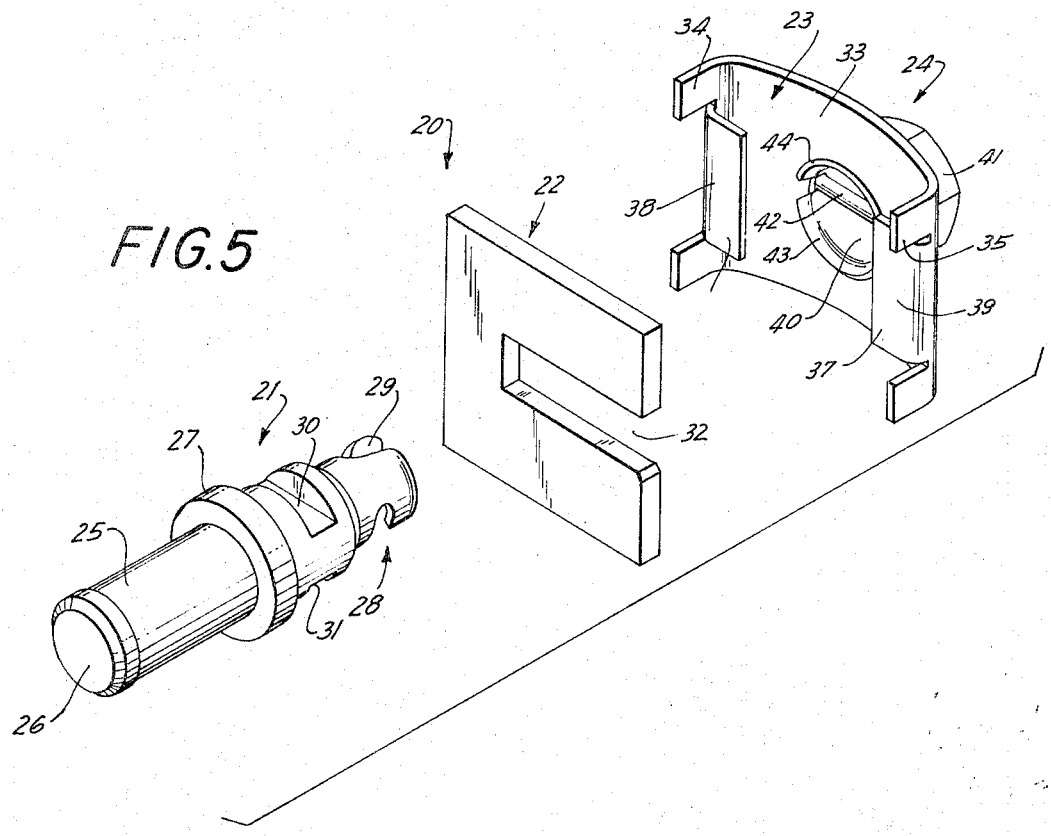
FIG. 5 is an exploded perspective view of the fastener assembly of the invention.

A fastener assembly 20 of the invention is shown in disassembled fashion in FIG. 5. The basic components are a stud 21, a clip 22, a spring 23 and a nut assembly 24.

The stud 21 has a cylindrically shaped forward portion forming a hanger member 25 terminating in its extremity in a slight annular protrusion 26. Mounted on the other end of hanger member 25 is an annular retaining ring or flange 27. The portion of stud 21 on the opposite side of flange 27 is a locking end portion 28. A helical cam slot 29 is located at the distant end of locking portion 28 and is open at the extreme end. The portion of the locking portion of stud 21 between cam slot 29 and flange 27 contains a pair of opposed slots 30 and 31.

Clip 22 is substantially rectangular in configuration and contains a notch 32 in one side thereof which extends across thereto. Spring 23 is a metallic member having a predetermined amount of flexibility. The spring has a base portion 33 of substantially rectangular configuration and curved slightly from the center to its lateral extremities. At the lateral extremities, a pair of opposing sides 34 and 35 extend substantially perpendicular to the base 33. Sides 34 and 35 are substantially parallel to one another. The central portion 36 of side 34 and the central 37 of side 35 are bent inwardly, the terminal edges of bent portions 36 and 37 are in substantial parallel alignment. In this position, bent portions 36 and 37 present a pair of respective engaging surfaces 38 and 39 for engagement with the surface of clip 22 when assembly 20 is interengaged.

Base portion 33 of spring 23 contains a central opening 40 which passes therethrough. Mounted in opening 40 is nut assembly 24. Nut assembly 24 includes a nut 41 of larger diameter then opening 40 and positioned in engagement with the rear surface of base 33. A pin 42 is mounted in fixed position to nut assembly 24 so that it is located transversely across opening 40. A flange 43 extends from the forward surface of nut 41 and extends through opening 40. Flange 43 has a flaired forward edge 44 which interengages with the inner surface of base 33 and serves to retain nut assembly 24 in engagement with spring 23. Opening 40 is slightly larger in diameter than flange 43 and additionally flange 43 is thicker than the thickness of base 33. This permits play between flange 43 and base 33 and permits rotations of nut assembly 24 with respect to base 33.

Interengagement between fastener assembly 20 and a bracket or similar supporting structure 45 is best depicted in FIGS. 1–4. It should be kept in mind that assembly 20 is readily adaptable to fastening two separate members together in a similar manner as that shown. The bracket 45 may be of any convenient type of material and may have any number of predetermined holes or openings for association with fastener assembly 20. As shown in the drawings, bracket 45 has at least one opening or passageway therethrough 46 for receiving fastener assembly 20. Assembly 20 may be of any low cost common type of metal or plastic material with spring 23 having a certain degree of flexibility to facilitate the locking action of the assembly.

In operation, stud 21 is inserted through opening 46 with locking portion 28 being passed therethrough. The interengagement with the inner surface of flange 27 and the outer of bracket 45 determines the extent to which stud 21 may be inserted into bracket 45. At this point, by predetermined dimensional design, recesses or slots 30 and 31 are exposed at the rear surface of bracket 45. Clip 22 is then inserted on locking portion of stud 21 with notch 32 receiving the portion of locking portion of stud 21 containing slots 30 and 31. The interengagement between the surfaces forming notch 32 and the surfaces forming slots or recesses 30 and 31 fixes clip 22 in substantially fixed position with respect to stud 21 and prevents rotation of clip 22 with respect to stud 21. At this position, as shown in the drawings, the inner surface of clip 22 is in interengagement with the rear surface of bracket 45.

Nut assembly 24 and interengaged spring 23 are then brought into engagement with stud 21. This is accomplished by extending cam slot 29 into engagement with pin 42. At that point, engaging surfaces 38 and 39 of spring 23 are brought into engagement with the rear surface of clip 22.

The interengagement between sides 34 and 35 of spring 23 and corresponding surfaces of clip 22 prevent rotation of spring 23 with respect to the stud and clip assembly. In this manner, if hanger portion 25 of stud 21 is held in fixed position, only nut assembly 24 can rotate. Engagement with nut 41 and rotation thereof will cause pin 42 to follow cam slot 29 which will in turn cause flexing of surfaces 38 and 39 of spring 23 bringing assembly 20 into tight locking interengagement. Since the length of cam slot 29 is of a predetermined length, the entire locking action can be achieved with a relatively small amount of rotation of nut 41. The force applied by depressed spring 23 will bring the components of assembly 20 into tight interengagement and also tightly engage assembly 20 with bracket 45. Disassembly can be achieved in the same simple manner by merely rotating nut 41 a small amount in the reverse direction to free pin 42 from interengagement with the surfaces of cam slot 29 while holding hanger portion 25 of stud 21 in fixed position. The assembly 20 can then be conveniently moved to another location on the same bracket 45 or moved to another bracket as desired. Assembly 20 as described above is of high strength and will permit hanger 25 to support a substantially heavy weight without affecting the rigid locked interengagement of assembly 20 with bracket 45. Naturally, the amount of strength of any particular assembly 20 is dependent upon the materials used and, in particular, the resiliency and strength of spring 23 in maintaining the tight interengagement between components of assembly 20 and between assembly 20 and bracket 45. The flange 26 at the extremity of hanger portion 25 forms a retaining assist shoulder to help in maintaining an object in position on hanger 25 when assembly 20 is being used. The components can be constructed of low cost materials and simplicity in design results in a fastener which is economical to produce and consequently can be marketed at a low price without sacrificing utility or efficiency.

Thus, the above objective, among others, are effectively attained.

I claim:

1. A fastener assembly for fastening two members together and for providing a hanger element on a bracket with an opening therein comprising:

a stud member adapted for passage through the opening in the bracket;

means to restrict the passage of said stud member through said bracket so that a hanger portion extends from one side of said bracket and a locking portion extends from the other side of said bracket;

locking means adapted to engage with the locking portion of said stud member and retaining said stud member in a fixed position with respect to said bracket;

said locking means and said stud having means thereon to facilitate the rapid interengagement and disengagement therebetween as desired so that said fastener assembly can be rapidly and efficiently associated with said bracket at a variety of different locations thereon;

said restriction means including an annular flange on the hanger portion of said stud of greater diameter than the opening in said bracket to prevent the movement of the stud in one direction;

at least one recess on the outer surface of the locking portion of the stud adjacent to the other side of the bracket;

a clip having a slot therein and being adapted to engage with the locking side of the stud and the recess therein so as to be retained in position with respect to the stud and to engage with the other side of the bracket to prevent the locking side of the stud to pass through the bracket;

the locking portion of the stud having a groove in the end thereof forming a cam slot;

a spring member having a central opening therein to receive the locking end of the stud;

said spring being substantially rectangular in configuration and having opposing flanges on two opposing sides thereof;

said flanges adapted to interengage with corresponding side walls on the clip;

a nut assembly rotatably mounted in the opening in the spring; and said nut assembly including a pin engageable with the cam slot in the locking portion of the stud and rotatable with the nut assembly so as to follow the cam slot causing the stud to be locked to the nut assembly and deforming the spring to apply a force to the clip and maintain the hanging portion of the stud in rigid fixed position with respect to the bracket.

2. The invention in accordance with claim 1 wherein said clip is substantially rectangular in configuration and the slot therein is engageable with a pair of opposing recesses in the locking end of the stud to prevent rotation of the clip with respect to the stud.

3. The invention in accordance with claim 1 wherein the cam slot in the locking portion of the stud is of a predetermined length to thereby restrict the travel length of the pin in the slot between the open and closed position to thereby facilitate rapid interengagement and disengagement between the stud and the nut assembly.

* * * * *